United States Patent [19]

Canziani

[11] Patent Number: 4,915,209

[45] Date of Patent: Apr. 10, 1990

[54] METHOD FOR CONTROLLING THE EXACT POSITIONING OF THE ITEMS TO BE SORTED IN AN AUTOMATIC SORTING PLANT

[76] Inventor: Francesco Canziani, via Contardo Ferrini 21, San Macario (Varese), Italy

[21] Appl. No.: 240,920

[22] Filed: Sep. 6, 1988

[30] Foreign Application Priority Data

May 23, 1988 [IT] Italy ............................... 20695 A/88

[51] Int. Cl.⁴ ............................................ B65G 43/00
[52] U.S. Cl. .................................... 198/357; 198/365; 198/456; 198/464.3; 198/476.1; 198/502.2; 198/505
[58] Field of Search ............... 198/357, 365, 456, 457, 198/444, 464.3, 476.1, 572, 575, 577, 802, 502.2, 505

[56] References Cited

U.S. PATENT DOCUMENTS

| | | | |
|---|---|---|---|
| 3,231,068 | 1/1966 | Harrison et al. | 198/365 |
| 3,451,522 | 6/1969 | Ahlstedt | 198/572 |
| 3,485,339 | 12/1969 | Miller et al. | 198/577 |
| 3,491,903 | 1/1970 | Hedrick et al. | 198/357 |
| 3,515,254 | 6/1970 | Gary | 198/572 |
| 3,550,748 | 12/1970 | Hauer | 198/365 |
| 3,747,781 | 7/1973 | Daigle et al. | 198/577 |
| 3,817,368 | 6/1974 | Wentz et al. | 198/572 |
| 3,912,071 | 10/1975 | Nielsen | 198/365 |
| 3,982,625 | 9/1976 | Wentz et al. | 198/572 |
| 4,096,936 | 6/1979 | Nielsen | 198/365 |
| 4,429,781 | 2/1984 | Holzhauser | 198/357 |
| 4,712,965 | 12/1987 | Canziani | 198/365 |
| 4,763,771 | 8/1988 | Geerts | 198/365 |
| 4,781,281 | 11/1988 | Canziani | 198/365 |
| 4,801,000 | 1/1989 | Canziani | 198/365 |
| 4,815,582 | 3/1989 | Canziani | 198/365 |

FOREIGN PATENT DOCUMENTS

| | | |
|---|---|---|
| 180771[U] | 2/1980 | Italy . |
| 21774 | 5/1982 | Italy . |
| 22482 | 7/1982 | Italy . |
| 22264 | 8/1984 | Italy . |
| 23110 | 10/1984 | Italy . |
| 20779 | 2/1985 | Italy . |
| 21310 | 4/1985 | Italy . |
| 2111933 | 4/1982 | United Kingdom . |

Primary Examiner—Joseph E. Valenza
Attorney, Agent, or Firm—Notaro & Michalos

[57] ABSTRACT

A method for controlling the exact positioning of the items to be sorted in an automatic sorting plant, comprises a plurality of carriages or units, each provided with a revolving belt which moves in a direction orthogonal to the direction of feed of the unit in order to unload the carried item. The method uses a loading mechanism which comprises a plurality of revolving loading belts, arranged head to head and angled at 45° with respect to the direction of feed of the units. The method according to the invention provides that, at the moment of loading, the unit belt is set in rotation and its speed is adjusted as a function of the speed of the item to be sorted, so that the loading takes place at a null relative total velocity.

19 Claims, 5 Drawing Sheets

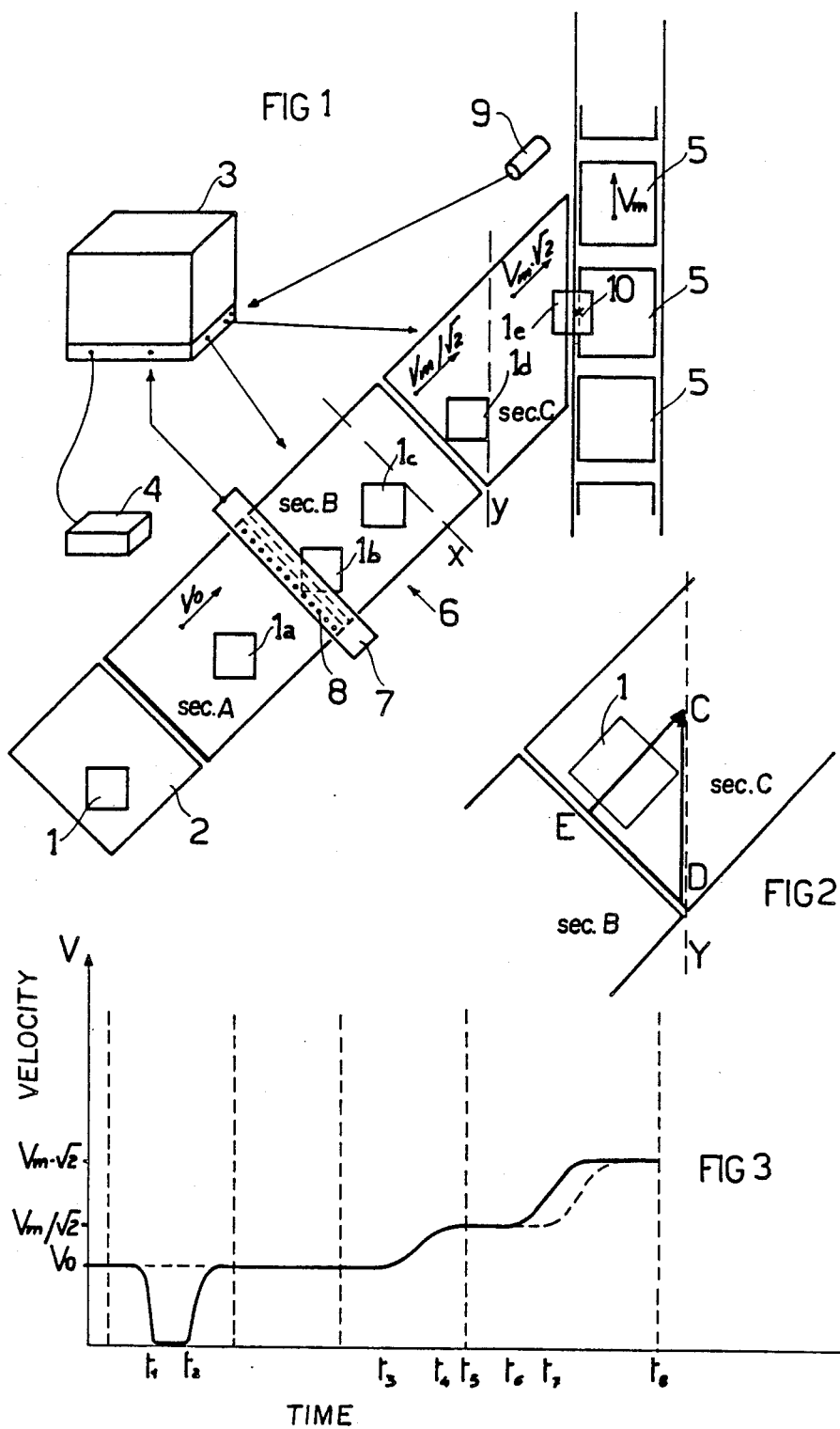

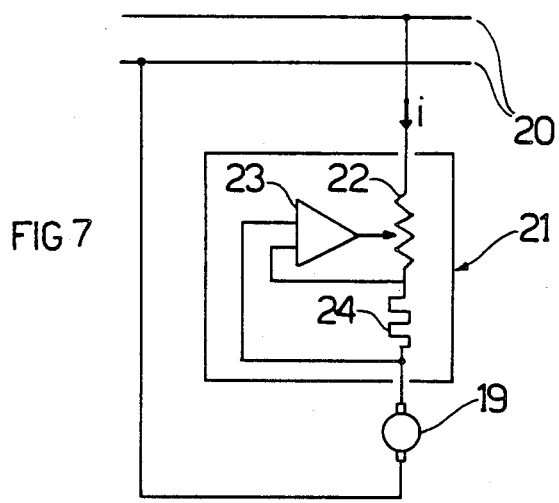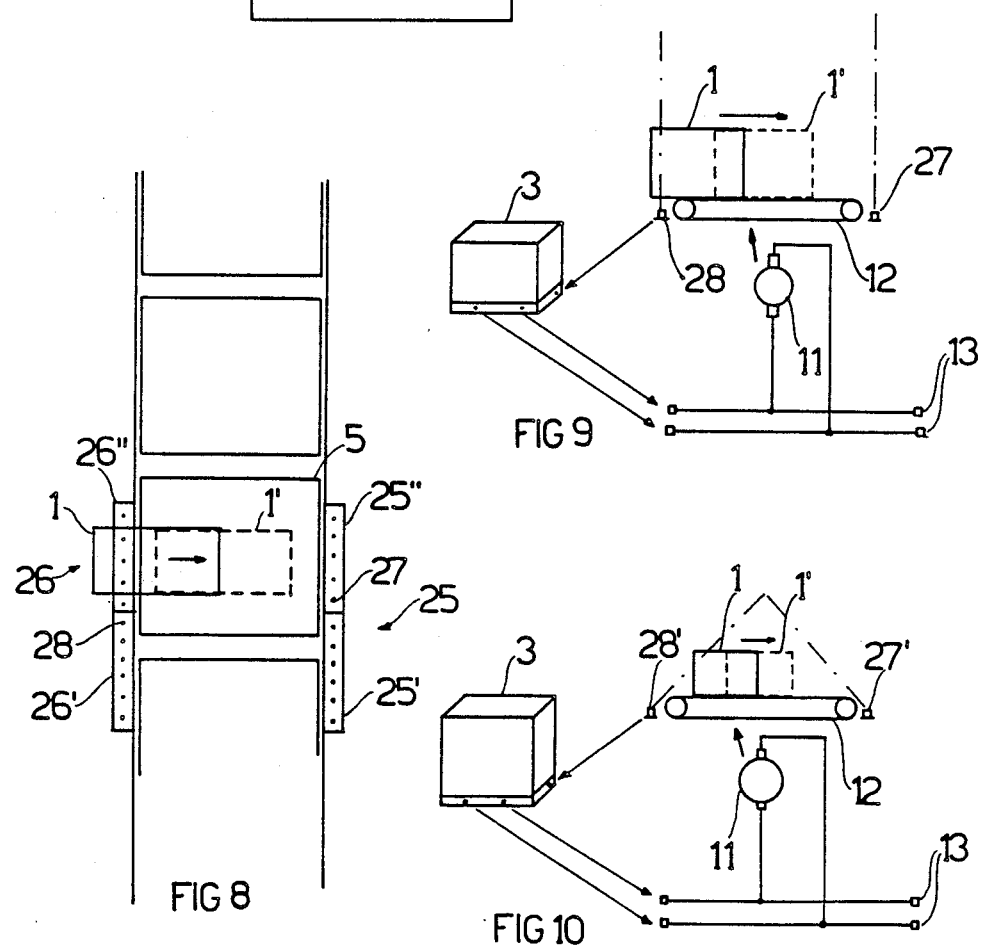

METHOD FOR CONTROLLING THE EXACT POSITIONING OF THE ITEMS TO BE SORTED IN AN AUTOMATIC SORTING PLANT

FIELD AND BACKGROUND OF THE INVENTION

The present method relates to plants for sorting items of the type used wherever it is necessary to deal with a remarkable amount of items, as, for instance, in post offices, in mail order companies and the like.

It is a method in which the different functions are controlled by a central computer which synchronizes the various functions and controls the course of the operations.

A plant of this type includes a fixed path along which runs a plurality of carriages or units, on which the items to be sorted are laid; these are unloaded automatically when the relevant carriage passes in correspondence of a collecting area determined when the item is introduced in the apparatus, by means of computer controlled and actuated devices.

Plants of this type are illustrated in the following Italian patents and/or patent applications in the name of the same applicant: patents Nos. 1,151,648, 1,152,067, utility model No. 180,771, applications Nos. 22476 A/83, 21310 B/85, 24227 B/85, 25859 A/81, 21774 B/82, 23110 A/84, 22264 A/84 and 20779 A/85. Each item to be sorted is coded by an operator and placed on the sorting circuit in induction stations the number of which varies according to the expected sorting flow.

Along said circuit, which may develop according to different shapes and sizes, there runs a train of units occupying the whole path or a part of it.

The units are set in motion, according to methods well-known in the art, e.g. by means of a continuous driving chain (solution adopted when the path is substantially a rectilinear one) or by means of electric motors located on board of the units and fed by power bars parallel to the path (solution preferred when the path is a carrousel).

The items, conveyed by the units, reach the collecting stations where they are unloaded. The unloading of the items is carried out by means of mobile belt conveyors forming the load surface of the units. Therefore, when an item is to be unloaded, the belt conveyor of the unit is driven sending tension to the relevant motor by means of bus bars (different from the power bars and sectioned in correspondence with the unloading stations) so as to allow drive control of the only unit-belt conveyor involved in the unloading. The unloading may be carried out at both sides of the sorting path simply by inverting the sense of rotation the belt conveyor, the direction of rotation of which is perpendicular to the unit motion. The object of the present invention is to increase precision and reliability of such sorting plants, intervening so as to assure a correct positioning of the item on the conveyance plane.

SUMMARY OF THE INVENTION

Synthetically, the invention relate to:

the compensation for the different positions in which the items may be on the induction station, in order to obtain a high precision of loading of the items at the center of the units;

the value of the speed vector at which the items transit onto the units and the way of dissipating the amount of spurious kinetic energy present during said transit;

the control of the power supply of the unit driving motors in order to avoid harmful stresses; and the re-centering of the items on the unit belt conveyor before the unloading step to correct possible shifts of the items on said belt conveyor during conveyance.

BRIEF DESCRIPTION OF THE DRAWINGS

The method according to the invention will be described now in detail with reference to the following figures wherein:

FIG. 1 shows, schematically, an induction station of the sorting plant and the various functions carried out according to the present method;

FIG. 2 shows, schematically, a detail relevant to the compensation for the position of the item on the belt conveyor of the induction station;

FIG. 3 shows a graph of the speed of the item in the different steps of loading onto the unit;

FIG. 7 is a scheme of the equalizer for the unit driving motors;

FIG. 8 shows, schematically, the re-centering of the item on the unit before unloading;

FIG. 9 shows schematically the re-centering of FIG. 8, in side view;

FIG. 10 shows an alternative to the re-centering of FIG. 9;

DESCRIPTION OF THE PREFERRED EMBODIMENT

Figure 4:
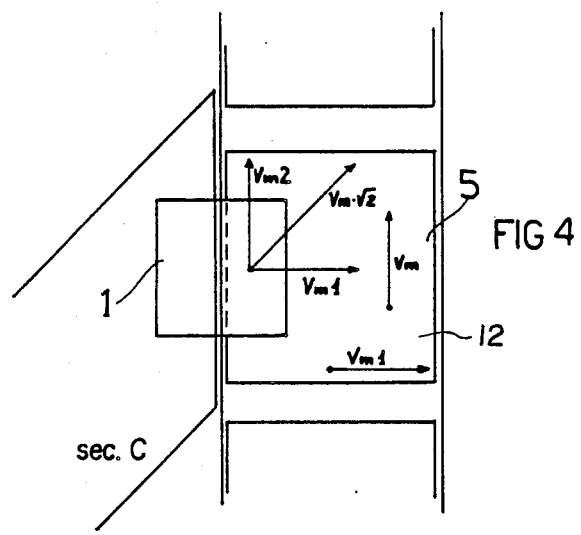
FIG. 4 shows the transit of the item on the unit.

For a better understanding of the method according to the invention, the various steps of the sorting cycle of an item will now be illustrated.

LOADING OF THE ITEMS FROM THE INDUCTION STATIONS TO THE CARRIER AND SORTING UNITS

The stations are of a well-known type, located at 45° with respect to the direction of motion of the units and formed by three sections where three distinct belt conveyors carry the item towards the chosen unit. Said belt conveyors rotate by effect of separate electric motors connected thereto so as to be able to independently vary the speeds of the different sections, the best performances being obtained by use of permanent magnet DC motors.

The invention consists in the loading process and in particular:

in determining the conveyance speeds of the item along the different sections so as to adjust its position and load the item onto the unit at a null total relative speed; and in the course taken on by said speeds which are of the continuous kind due to the method by which the changes of speed are carried out.

The invention, better illustrated hereinafter, is meant to obtain a high precision in positioning the item at the center of the unit. In the prior art there are well-known load processes using induction stations of the described type with systems that measure and weigh the items and having different conveyance speeds for the various sections of belt conveyor. The speed diversification, however, is of a discontinuous kind, with a typical step-like course and it is obtained e.g. by means of sensors that intercept the items on the belt conveyor and actuate the change of speed.

U.S. Pat. No. 4,429,781 to HOLZHAUSER discloses an induction station positioned at a certain angle with respect to the direction of movement of the conveyor. Said station presents two distinct sections: on the first one the item is given an acceleration over a determined, constant space, one being able to control said acceleration according to the weight of the item; by the second station the item is loaded onto the conveyor at a constant speed equal to the value reached during the acceleration phase. The loading speed is calculated so as to present a component vectorially equal to the speed of the conveyor and therefore to prevent the item from overturning during the loading phase.

This method can offer good results when the conveyor is formed by a continuous belt, even if it may cause overturning of items with high center of gravity since the dissipation of the speed component that is to be removed takes place by friction.

When the conveyor, instead, consists of carrier units, the above mentioned method is somewhat inaccurate. In fact, it does not take into account the variable position of the item on the induction belt conveyor, which needs a compensation for a precise loading and does not allow determination of the final position of the item on the unit. The dissipation of speed occurs by friction and does not consider the different masses of the items to be sorted and therefore the different kinetic energies to be absorbed.

U.S. Pat. No, 3,982,625 WENTZ discloses an induction station for sorting machines formed by different mobile belt conveyors by means of which the items are unloaded onto the carrier units presenting a tiltable plate surface.

It is a system providing for the coding of the items by an operator and the introduction of said items, by another operator, in the end section of the induction station. Said end section, formed by mobile belt conveyors the synchronization of which is a function of the geometric figures drawn on a belt coinciding with the geometric figures drawn on the adjacent one, is apt to shift by a certain angle so as to provide the item with a speed component parallel to the movement of the units.

This patent too does not take into account the control of the dissipation of the speed component perpendicular to the motion of the units; the thrust in a direction parallel to that of the belt conveyor is obtained by rotating the end part of the induction belt conveyor according to the combination of signals coming from sensors intercepting the item on the induction belt conveyor.

Briefly, the main inconvenience of the known loading methods is the imprecision in positioning the item at the center of the unit, and, consequently, the higher production, installation and running costs of a sorting plant, due to the need for a greater running length of the circuit, wider openings of the collection stations etc.

Finally, such an imprecision may cause sorting mistakes and therefore the need for manual interventions.

The loading process provided by the present invention can be described with reference to FIG. 1.

An item 1 is placed, either directly by an operator or as it comes from a belt conveyor, onto a synchronization unit 2 made of a mobile belt. While item 1 is in this position, the operator transmits the characterizing data of the item to the central computer 3 by a key-board 4 (e.g. the destination address or the ZIP code). Another means not indicated in the figure to carry out said modification may consist of an optical wand or of an automatic reading system, e.g. a bar code.

Computer 3 reserves then one of receiving units 5 which is available and which will be at that moment at a certain distance from induction station 6 and undertakes the necessary functions for conveying the item to the selected unit.

Synchronization unit 2 has just the function of allowing the operator to carry out coding operations and to place the item onto section A of induction station 6 in periods of time consistent with the computer effected reservation.

Item 1 thus passes onto section A (position $1a$) where it is weighed and conveyed towards section B at a constant speed Vo, having value, e.g., 1 m/s.

Along said path it comes up against a barrier 7 (position $1b$) formed by a series of sensors 8 (e.g. photoelectric cells) apt to detect the size of the itme and its position on the belt conveyor of the induction station. These dimensional and topological data are reported to computer 3 and are detected in the following way:

the maximum number of shaded cells and the time during which one cell at least remains shaded (Vo being constant and known) provide the two dimensions of the item;

the position of the shaded cells provides the topological datum. Item 1 proceeds at Vo speed as far as the fictitious target X. Said target is qualified as fictitious it because is established in the memory of computer 3 at a distance from barrier 7 greater than the diagonal of the item having the maximum sizes allowed by the sorting plant.

In this way one is certain that when it reaches target X, the item has abandoned barrier 7 completely.

At the time when the item reaches target X (position $1c$) the speed of the belt conveyor of section B is brought by computer to the value $Vm\sqrt{}/2$; (e.g. 1.7 m/s) and the item passes to section C where the belt rotates at the same speed $Vm/\sqrt{}2$; (where Vm is the motion speed of the units) and proceeds as far as a second target Y (position $1d$) the position of which, as is better illustrated hereinafter, is determined by the computer according to the impulses coming from an encoder 9 connected to the sorting machine. The speed of the belt of section C is then increased up to the value $Vm.\sqrt{}2$; and the item (position $1e$) is then loaded onto the selected unit. As already indicated, the object of such method is to obtain the loading of the item perfectly at the center of the unit reserved by the computer. In this sense speed $Vm.\sqrt{}2$; is determining, as well as the moment in which one has to switch from this speed to speed $Vm/\sqrt{}2$.

Item 1 can find target X at any positions on the belt of the induction station and, upon loading (position $1e$), the reserved unit has to be in such a position that center 10 of its loading side correspond to the direction of feed of the item on the induction station. To this end, the value of speed $Vm\sqrt{}/2$; compensates for the position of the item on the belt over a period of time which is constant from target X to the beginning of section C and is variable from this point as far as target Y.

To better clarify this concept it is sufficient to consider that the item may be on the conveyor belt of the induction station in any position, from the right end to the left end of said belt. In order to always obtain a loading at the center of the reserved unit, the latter should be in a position consistent with the position of the item at the moment of loading. In other words, it is necessary to synchronize the position of the unit that has to receive the item with the direction of feed of said item on the induction station, so that the center of said unit lays, upon loading, along said direction of feed.

The position of the item on the belt has therefore to be compensated for, by imparting to the item an opportune speed, for a certain period of time.

FIG. 2 shows why said speed has to take on the value $Vm\sqrt{2}$; To compensate for distance $DC = Vm.t$, covered by the unit in time variable according to the position of the item on the belt, it is necessary that the item cover space $EC = Vm/2.t$, since triangle CDE is right-angled, with base angles of 45° (it is to be noted the particular arrangement at 45° of the induction station).

In fact, side $EC = ED$ being $$DC = \sqrt{EC^2 + ED^2} = \sqrt{2}.EC$$

from which:

$$EC = \frac{DC}{\sqrt{2}} = \frac{Vm \cdot t}{\sqrt{2}}$$

dividing both terms of relation (1) by t one obtains the compensation speed $EC/t = Vm/\sqrt{2}$.

From a practical point of view, such compensation can be effected, e.g. in the following way.

The photocells of barrier 7, which detect the position of item 1, can be arranged so that the step between two consecutive photocells be equal to the time elapsing between two impulses of encoder 9, multiplied by the unit speed (encoder step). In certain cases the photocell step may be either a multiple or a fraction of the encoder step: in this case one has recourse to a constant that would either multiply or divide the encoder step with a view to referring it back to the photocell step.

Therefore, computer 3 can compare the position of the item on the induction belt with the position of the reserved unit and insist with speed $Vm/\sqrt{2}$ for a suitable period of time, as along as the target is reached. The target can be defined as the locus of the points the distance of which from the beginning of Section 3 is equal to the number of impulses of encoder 9 corresponding to the shaded photocells 8.

The described method is illustrated graphically in FIG. 3 where the course of the speed in time is considered.

Until moment $t_3$ the item moves at constant speed Vo, possibly after a pause $t_2 - t_1$ on synchronization belt 2, during which coding is made; during interval $t_5 - t_4$ (being constant because it corresponds to the space between target A and the beginning of section C) the speed has value $Vm/\sqrt{2}$; interval $t_6 - t_5$ in which there is still speed $Vm/\sqrt{2}$, is instead variable because it depends on the position of the item on the belt (for instance for another position of the item it could be equal to $t_7 - t_5$); then from moment $t_6$ until $t_8$ (corresponding to loading onto the unit) the speed has value $Vm/\sqrt{2}$.

LOADING OF THE UNIT

At this time, item 1 transits on the unit with a direction different from that of the motion of the units and it is required, therefore, that a part of the kinetic energy due to the transit speed be removed.

In the method according to the invention (FIG. 4) item 1 transits on unit 5 at speed $Vm\sqrt{2}$.

Since the direction of said speed forms a 45° angle with respect to the direction of the motion of the units, it is possible to split up $Vm/\sqrt{2}$ into two components $Vm_2$, $Vm_1$, respectively parallel and perpendicular to the motion of the units, having module equal to Vm. In this regard, it is opportune to point out that the already mentioned HOLZHAUSER patent teaches to make the item transit on the belt conveyor at such a speed as to have a component vectorially equal to the speed of the conveyor, the other component being derived as a consequence.

In the present method, instead, it is disclosed that the transit of the item on the unit occur at a null total relative speed. In fact, as is better explained hereinafter, the loading belt conveyor of the unit is made to rotate during transits at a speed vectorially equal to $Vm_1$. In this way, the item transits on the unit at a speed $Vm/\sqrt{2}$ and therefore with components $Vm_2$ and $Vm_1$, while the unit moves at speed $Vm = Vm_2$ and its loading belt conveyor at speed $Vm_1$. Therefore the total relative speed of the item is null during the phase of transit on the unit.

The component $Vm_2$ does not cause any negative interactions for the transit phase, while the component $Vm_1$ causes kinetic energy $E_c = \frac{1}{2}m\, Vm_1$ that needs to be absorbed.

A further object of the present method is the controlled dissipation of said kinetic energy so as to take into due account mass m of the item to be sorted.

Several methods are known in the art to remove the spurious part of kinetic energy, but, though performing their task, they cause some inconveniences because the fact that the kinetic energy depends on the mass of the item, and is clearly not the same for all the sorted items, is not taken into account.

One of these well-known methods, of dissipative type, consists of equipping the units with loading surfaces having high coefficient of friction and/or providing them with particular projecting elements. This turns the spurious kinetic energy into heat by means of the friction generated between the item and the surface of the unit or of the conveyor belt.

The unpredictability of the final position of the item on the unit and the tilting of the items having a high center of gravity are the main inconveniences connected with the use of said method.

A further method teaches the use, together with surfaces having suitable adherence, of mechanical barriers against which the item knocks and, frequently, rebounds onto the unit. Also in this case we note some inconveniences: the final position of the items, especially if small, is unpredictable; the items having large sizes may set in between the units; the possible use of retainer edges does not solve the problem completely because it may cause mechanical interactions; and fragile parcels may be damaged by the impact.

In summary, the known methods carry out a loading of ballistic type, contrary to the maximum precision required in sorting plants to avoid waste of money due, e.g. to sorting mistakes and to the adoption of large size collecting stations.

To remove said spurious kinetic energy the present method provides a solution of dissipative type, but in a controlled way.

When the item transits on the unit, the unit belt rotates at a speed equal to that of component $Vm_1$. This control is given by the central computer and it prevents the transiting item from overturning.

From this time on the unit belt is slowed down according to a deceleration ramp controlled by a particular drive control hereinafter described. Therefore, the kinetic energy to be dissipated is converted by the drive control opposing the rotation of the belt and the slowing down is controlled since the system compensates automatically for the variations of kinetic energy of the items having different masses.

The advantages obtained with said solution consist in avoiding knocks, tiltings and slippings of the items; handling with care the fragile items, an item passes from a moving belt to another, the motion of both belts being the same; obtaining a predictable and constant position of the items on the unit and therefore a precision in the sorting steps.

Figure 5:
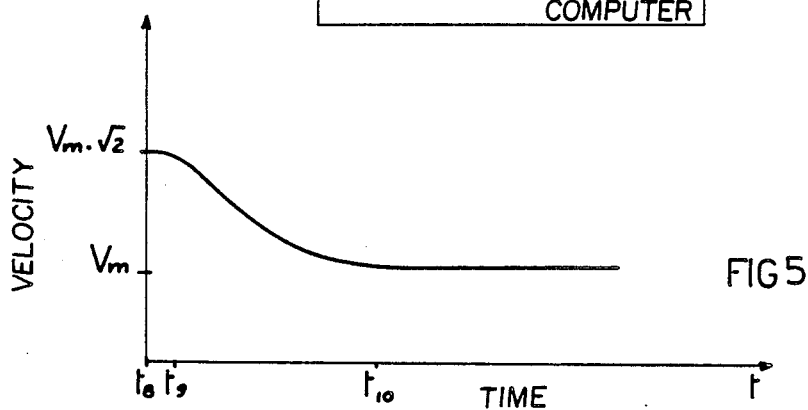
FIG. 5 shows a graph of the speed of the item during the transit on the unit.

FIG. 5 shows the course of the speed module of the item in the period of time, starting from moment $t_8$, in which the item starts its transit on the unit. The item keeps speed $Vm.2$ (transit with null total relative speed) over a certain interval $t_9 - t_8$ so as to be loaded on the unit for the most part; the interval $t_{10} - t_9$ is determined by the drive control controlling the slowing down of the unit belt as a function of the mass of the item.

Figure 6:
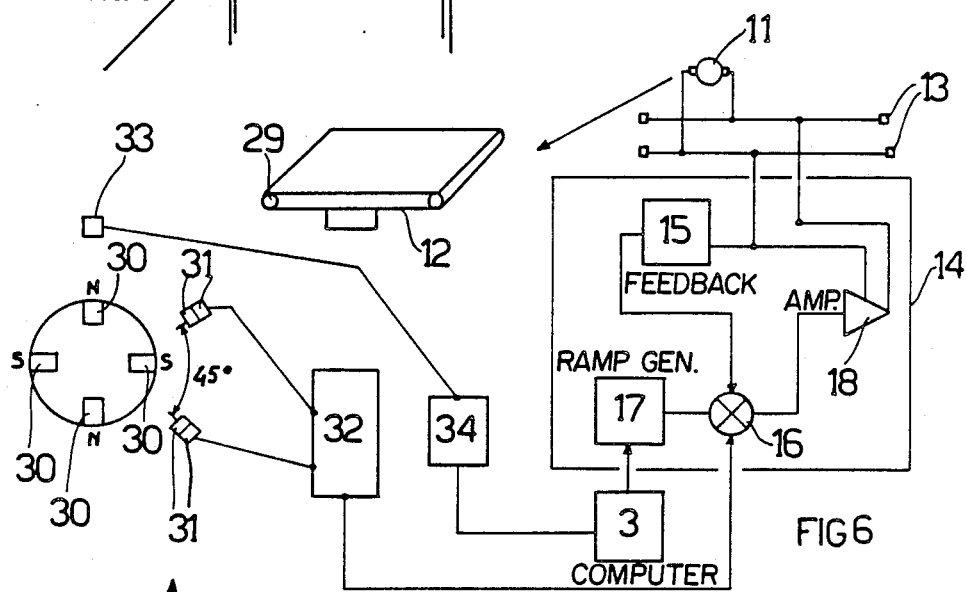
FIG. 6 is a block diagram of the drive devices allowing for the controlled dissipation of spurious kinetic energy during loading of the unit.

FIG. 6 shows how the dissipative solution can be obtained in a controlled way, by intervening on the feed of the motor setting in rotation the unit belt. It is a matter of comparing the feed tension of said motor with a signal coming from a ramp generator, this signal being controlled by the central computer as a function of the mass of the transiting item. It is thus possible to intervene on the feed tension of the motor of the belt-unit so as to obtain a deceleration apt to position the item at the center of the unit and to control the amount of energy that is to be dissipated. Motor 11 of belt 12 of the unit is fed by bars 13 and the tension or voltage is controlled by drive control 14.

Feed-back 15 detects the armature tension of motor 11 and refers it to node 16 which compares it with the signal coming from ramp generator 17. This signal has a form determined by computer 3 as a function of the mass of the item in order to obtain a deceleration of the type illustrated in FIG. 5 ($t_{10} - t_9$).

On the basis of this comparison, node 16 acts upon amplifier 18 in order to obtain a tension on bars 13 of variable value, and consistent with the signal of the ramp generator.

The right correspondence between the speed of motor 11 that should actuate belt 12 from a speed $Vm_1$ to the final value 0 and the feed tension is obtained through feedback 15 as a function of the motor speed.

The drive control may be located either on board of the receiving unit 5 or on the ground. From a building point of view the best results are obtained by providing the unit belts with a motor having remarkable acceleration and deceleration characteristics, such as for instance a permanent magnet DC motor.

EQUALIZER FOR DRIVING MOTORS

The sorting plant according to the present method comprises a unit train that can be handled by different systems, known in the art, such as driving belts, driving units set along the path, motors set onboard of the units themselves. In the latter case two situations may occur: either all the units have a motor on board, or only some of the units are provided with motor, the remaining ones being driven by groups by the said driven units.

The choice of a particular kind of drive depends on several factors, and especially on the type of sorting course. When the path is rectilinear a belt driving system may be conveniently adopted, whilst in carrousel paths, with curves and slopes, the adoption of onboard motor means may simplify the construction of the plant and provide better performances, especially if permanent magnet DC motors are used.

The onboard motor solution becomes therefore preferred and frequent when one wishes to limit the running length of the conveyor or to adapt the installation to pre-existing premises.

Such a solution entails however an inconvenience due to the differences of absorbed current existing among the various driving motors. In fact, even by employing the same kind of motors, the absorbent current does not show the same value in all the employed motors: it happens thus that the motors that absorb a higher current may be subject to stresses such as to jeopardize their life or to badly affect the reliability of the sorting plant.

Through the power bars that feed the driving motors there runs, on the average, a current value equal to the product of the current nominal value of one of the said motors multiplied by the number of the motors present.

It occurs thus that the motors of the units that run along a downhill path absorb a current lower than the nominal one (because they perform a lesser work), and that the amount of non-absorbed current is shared out among the other motors, particularly those that are absorbing their nominal current (e.g. the motors of the uphill running units).

Said amount can represent an increase in current capable of producing unwanted thermal and electric stresses, as well as of causing the demagnetization of the magnets of the DC motors.

With a view to overcoming such inconveniences to the advantage of the reliability and precision of the sorting plant, the present method intends, as further object, to assure the proper working current for each motor.

It is a matter of controlling the current absorbed by each motor, taking the proper steps to reduct it in case it is higher than the nominal value of the motor. This control function is performed by an equalizer device multipled to the motor and described in FIG. 7. The driving motor 19 draws the feed by power bars 20 set parallel to the sorting course, through the equalizer 21. Said device consists of a variable resistance 22, of an amplifier 23 and a shunt 24, and is calibrated so that the current i that passes through motor 19 does not exceed the nominal value of the motor itself.

By effect of current i, at the ends of shunt 24 there is a tension that is transmitted to amplifier 23, which acts upon the variable resistance 22 that limits the current value. Thus, when current i exceeds the nominal value of motor 19, the value of resistance 22 increases in order to keep current i within reasonable bounds.

RE-CENTERING OF THE ITEM ON THE UNIT

The items are thus carried from the units up to the unloading stations where they are discharged to the respective collecting mouths according to their coding. Although the described method allows a precise loading of the items at the center of the units, it may occur that, during conveyance, some items shift and arrive at the unloading devices in a position different from the one in which they were upon loading. This mostly occurs when the item has a high center of gravity and when, as it is being conveyed, it falls on its largest bearing surface.

Such variation in the item position jeopardizes the loading precision provided by the present method, and must be overcome.

A further object of the present method relates to a re-centering system of those articles which, in the unloading step, are not in the original loading position any longer. It is not always possible to bring the item back to the center of the unit; however, thanks to the re-centering, the item can be brought to a more suitable position to obtain a predictable and constant discharge trajectory. The items having sizes similar to those of the unit may be considered to be, with a fairly good degree of approximation, always at the center of the unit. In this case the re-centering is important to avoid that the item, in consequence of a fall, jut out of the unit when it comes before the unloading devices. The small-size items, on the contrary, may arrive at the unloading devices in an off-centered position; in this case the re-centering allows to bring back the item to a position as central as possible. With reference to FIG. 8, the re-centering system consists of two sets 25,26 of photocells 27,28.

Said photocells, adjacent and parallel to the sorting path, are located short before the unloading stations. When an item 1 has changed its position on the unit, it is intercepted by either of the two sets 25,26 and then brought back to a position as central as possible (position 1') by means of a revolution of the unit belt. The belt is actuated in the arrow direction until there are no more shaded units 28 or until one of the photocells 27 is shaded. Photocells 27,28 are divided in two consecutive groups: the first group 26' and 25' checks the change in the item position on the unit, whilst the second group 26" and 25" confirms what the first group has checked.

Failing such a confirmation, no re-centering is effected. In fact, a photocell of the first group may happen to be either out of work or dirty, and therefore to signal a situation not corresponding to reality.

Such a check and check confirmation sequence allows to avoid re-centering errors.

In FIG. 9 one can note that the re-centering of item 1 takes place thanks to computer 3 that, after having been informed by photocells 28 of the uncorrected position of the item, sends tension to bars 13 and actuates the motor 11 of unit belt 12. Item 1 thus shifts in the direction of the arrow, taking on position 1'.

A different re-centering is shown in FIG. 10. In fact the solution of FIG. 9 does not allow to check the position of items that do not jut out of the units, though being in an off-centered position.

The re-centering according to FIG. 10 provides for the convergence of the beams of photocells 28' and 27'.

In this way an item 1 too, being e.g. of small size and in an off-centered position without jutting out of the unit, can be re-centered according to the hereinabove mentioned criteria.

Therefore one of the solutions of FIGS. 9 and 10 may be chosen, in function of the average sizes of the sorted items.

In the place of photocells there can be used other devices not shown in the drawings: for instance, a laser scanner that detects from above the position of the item, or other types of sensors.

FLOW DIAGRAMS

Figure 11:
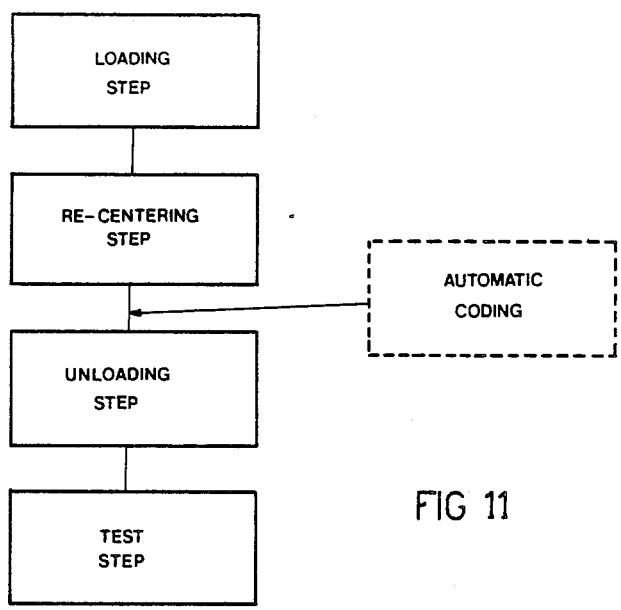
FIGS. 11-13 show flow diagrams relevant to the functions carried out by the present method.
Figure 12:
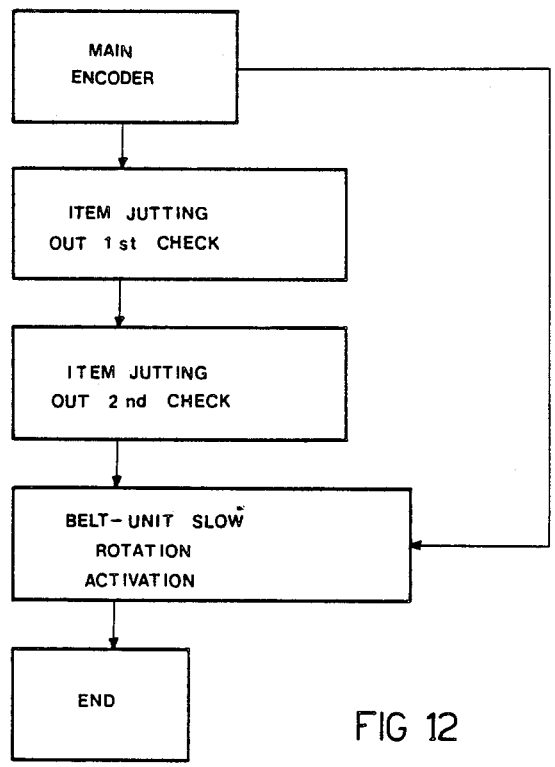
Figure 13:
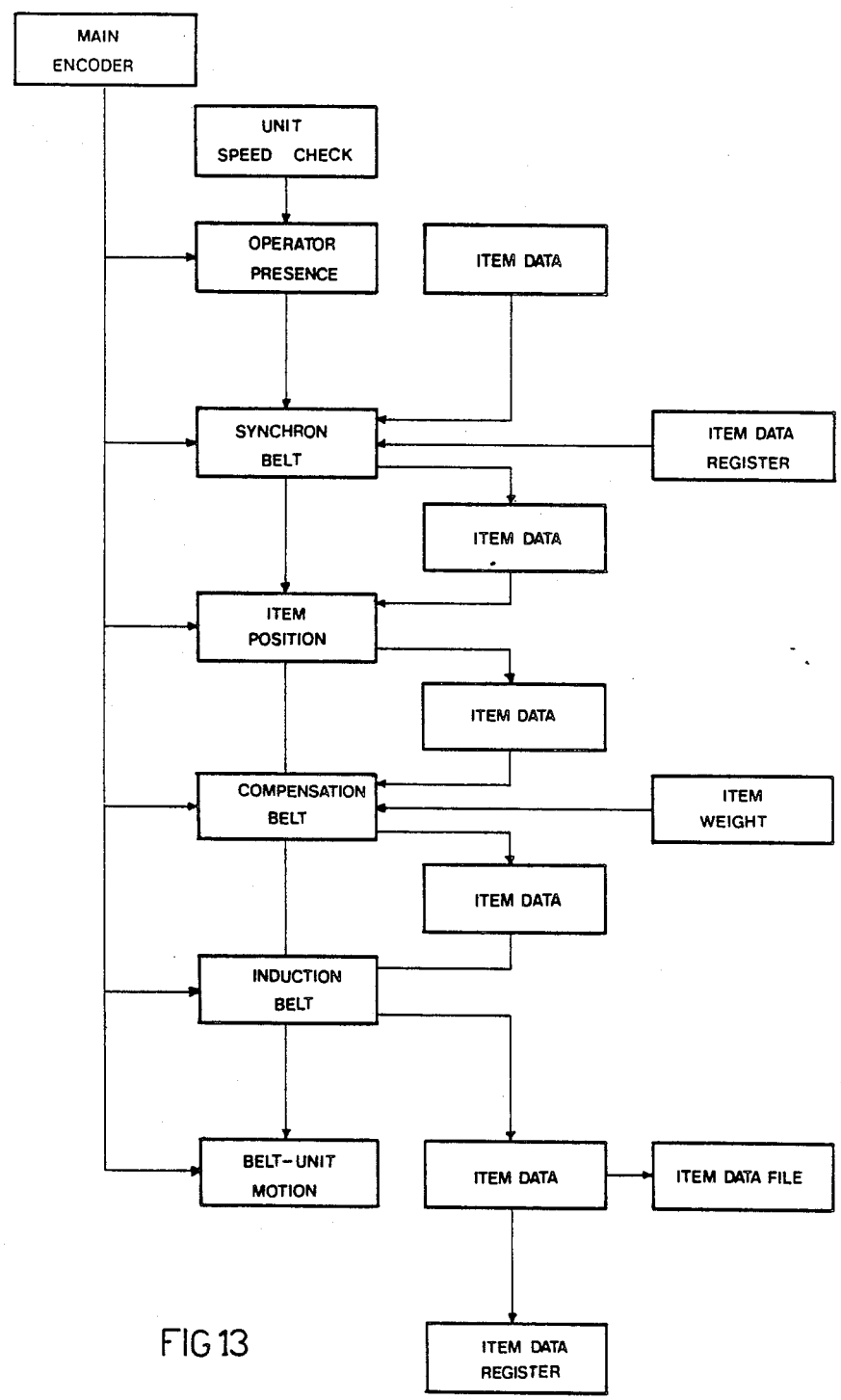

FIGS. 11–13 show the flow diagrams relevant to the main functions performed by the sorting plant and object of the present method. FIG. 11 refers to the main functions of the present method, namely the sequence of the loading, re-centering and unloading of the items to be sorted and the test for checking the proper working of the unit belts.

The "automatic coding" diagram indicates that it is possible to spare the coding operations by installing an automatic code reader (e.g. post code or bar code) before the unloading area. This would allow the reader to automatically scan the item destination and would provide the central computer with the necessary data for the unloading.

FIG. 12 refers to the functions performed during the loading step. The main encoder allows to know the unit position, and the "operator presence" diagram is enabled through the control of the unit speed. The item data (address, post code), codified by the operator, are inserted in the computer and transferred each time to the subsequent devices. The item data reach thus the synchronized belt area, where a unit is reserved after referring to the data register of the sorted item.

The item passes to section A of the induction station where both position and size are detected, and then to section C (compensation belt), where it is weighed. Then the item proceeds to section 3 (induction belt) to be loaded on to the reserved unit.

At the moment of loading the unit belt moves in order to receive the item, whilst the item data are recorded on the shift register (the same as previously cited for the unit reservation) and then filed. FIG. 13 refers to the item re-centering phase before the unloading takes place.

Starting from the main encoder that controls the unit motion there is effected the first checking on the off-center position of the item, and then the second checking that is confirmative of the first. The unit belt is activated if it needs re-centering, and the operation is over.

I claim:

1. A method of controlling the position of items (1) to be loaded onto a plurality of receiving units (5) which move at a first velocity (Vm) in a feed path, each receiving unit having a driven belt (12) thereon which is moveable orthogonally to the feed path, and utilizing at least one induction station (6) having a plurality of driven belts extending in series at an angle to the feed path, comprising:
   loading an item (1) onto the induction station (6);
   using the driven belts of the induction station to move the loaded item at a second velocity (Vo) toward a selected one of the units (5) for loading the loaded item onto the selected one of the units; and
   moving the driven belt of the selected one of the units at a third velocity (Vm1) in a direction orthogonal to the feed path, the third velocity being a function of the angle and of the second velocity equal to a component of the second velocity which is orthogonal to the feed path so that the loaded item moves onto the driven belt of the selected one of the units at null relative velocity.

2. A method according to claim 1 wherein the angle equals 45° and the second velocity equals the first velocity times the square root of two.

3. A method according to claim 1 including decelerating the belt of the selected one of the units to zero velocity according to a controlled deceleration ramp function, after the loaded unit has moved from the induction station onto the driven belt of the selected one of the units.

4. A method according to claim 3 wherein the angle between the induction station and the feed path is 45°.

5. A method according to claim 4 including measuring the mass of the loaded item on the induction station, driving the belt of the selected one of the units using a controlled voltage, and controlling the voltage as a function of the mass of the loaded unit.

6. A method according to claim 1 including measuring the size and position of the loaded item on the induction station and controlling the second velocity of the driven belts on the induction station as a function of the size and position of the selected item so that the selected item is centered on the selected one of the units.

7. A method according to claim 6 including using a plurality of photocells at the induction station for measuring the size and position of the loaded item on the induction station.

8. A method according to claim 1 including measuring the size of the loaded item on the induction station, initially moving the loaded item on the induction station at a velocity which is less than the second velocity and as a function of the size of the item, and thereafter accelerating the loading item on the induction station to the second velocity.

9. A method according to claim 1 including detected the position of the loaded item on the selected unit using a plurality of photoelectric cells.

10. A method according to claim 9 including providing a set of photoelectric cells on either side of the selected unit extending in the direction of the feed path for determining the position of the loaded item on the selected unit.

11. A method according to claim 10 including determining the position of the loaded item on the selected unit using convergent beams to and from the photoelectric cells.

12. A method of controlling the position of items (1) to be loaded onto a plurality of receiving units (5) which move at a first velocity (Vm) in a feed path, and utilizing at least one induction station (6) having a loading surface moving at an angle to the feed path, comprising:
loading an item onto the induction station;
measuring the size and position of the loaded item at a sensor barrier on the induction station;
weighing the loaded item on the induction station;
driving the loaded item on the induction station up to a first fictitious target which is set at a distance from the sensor barrier which is at least equal to the largest dimension of an item to be loaded onto the induction station in a direction parallel to the induction station and at the angle to the feed path;
reducing the velocity of the loaded item on the induction station from the first fictitious target to a second fictitious target which is selected as a function of the detected position of the loaded item on the induction station in the direction parallel to the induction station and at the angle to the feed path; and
accelerating the velocity of the loaded item on the induction station at the second fictitious target, up to a selected velocity which includes a component orthogonal to the feed path for feeding the loaded item onto a selected one of the receiving units.

13. A method according to claim 12 wherein the sensor barrier comprises a plurality of photoelectric cells disposed at regular intervals in a direction orthogonal to the direction of the induction station, the size of the loaded item being determined as a function of the maximum number of cells shaded by the item as the item moves along the induction station passed the sensor barrier.

14. A method according to claim 12 including moving the loaded item on the selected unit after the loaded item has passed from the induction station to the selected unit, for centering the loaded item on the selected unit.

15. A method according to claim 14 including detected the position of the loaded item on the selected unit using a plurality of photoelectric cells.

16. A method according to claim 15 including providing a set of photoelectric cells on either side of the selected unit extending in the direction of the feed path for determining the position of the loaded item on the selected unit.

17. A method according to claim 16 including determining the position of the loaded item on the selected unit using convergent beams to and from the photoelectric cells.

18. A method according to claim 12 including providing a driven belt on each receiving unit moving in a direction orthogonal to the feed path, moving the driven belt of the selected unit at a velocity equal to a component to the selected velocity for the loaded item on the induction station at the second fictitious target which is orthogonal to the feed path so that the loaded item is received onto the driven belt of the selected unit at null velocity, and thereafter decelerating the driven belt of the selected unit to zero according to a deceleration ramp function.

19. A method according to claim 18 wherein the angle is 45° and the selected velocity of the loaded item on the induction station at the second fictitious target is equal to the velocity of the receiving units in the feed path times the square root of two.

* * * * *

UNITED STATES PATENT AND TRADEMARK OFFICE
Certificate

Patent No. 4,915,209                          Patented: April 10, 1990

On petition requesting issuance of a certificate for correction of inventorship pursuant to 35 U. S. C. 256, it has been found that the above-identified patent, through error and without deceptive intent, improperly sets forth the inventorship.

Accordingly, it is hereby certified that the correct inventorship of this patent is: Francesco Canziani, San Macario (Varese) Italy and Attilio Soldavini, Ferno- VA, Italy.

Signed and Sealed this Seventeenth Day of March, 1998.

WILLIAM E. TERRELL
*Supervisory Patent Examiner*
Art Unit 3615